(12) United States Patent
Shareef et al.

(10) Patent No.: US 11,404,998 B1
(45) Date of Patent: Aug. 2, 2022

(54) PNEUMATIC SOLAR TRACKING SYSTEM FOR SOLAR PANELS

(71) Applicants: UNITED ARAB EMIRATES UNIVERSITY, Al Ain (AE); AL AIN DISTRIBUTION COMPANY, Al Ain (AE)

(72) Inventors: Hussain Shareef, Al Ain (AE); Tarik Tayseer Shadid, Al Ain (AE)

(73) Assignees: UNITED ARAB EMIRATES UNIVERSITY, Al Ain (AE); AL AIN DISTRIBUTION COMPANY, Al Ain (AE)

(*) Notice: Subject to any disclaimer, the term of this patent is extended or adjusted under 35 U.S.C. 154(b) by 0 days.

(21) Appl. No.: 17/533,063

(22) Filed: Nov. 22, 2021

(51) Int. Cl.
*H02S 20/32* (2014.01)
*F15B 15/20* (2006.01)
(Continued)

(52) U.S. Cl.
CPC .............. *H02S 20/32* (2014.12); *F15B 15/20* (2013.01); *G01B 11/26* (2013.01); *G01C 9/02* (2013.01);
(Continued)

(58) Field of Classification Search
CPC ......... H02S 20/32; F15B 15/20; G01B 11/26; G01C 9/02; G01K 1/024; G01K 1/14;
(Continued)

(56) References Cited

U.S. PATENT DOCUMENTS 8,017,895 B2    9/2011 Moser
8,459,249 B2 *  6/2013 Corio ................... F24S 30/425
                                             126/606
(Continued)

FOREIGN PATENT DOCUMENTS

| CN | 102667656 A | * | 9/2012 | ............... F24J 2/067 |
| CN | 207625504 U |   | 7/2018 | |
| CN | 112805510 A | * | 5/2021 | ............ F16F 15/035 |
| CN | 213185998 U | * | 5/2021 | |
| WO | WO-2018090155 A1 | * | 5/2018 | |

OTHER PUBLICATIONS

"Solar Radiation Tracking using Pneumatic System to Increase the Efficiency Compared to Conventional Stationary Solar Panel System" by Pathaketai. International Research Journal of Engineering and Technology (IRJET) vol. 06, Issue: 06, Jun. 2019, (Year: 2019).*

Alboteanu, Ionel Laurentiu. "Pneumatic Tracking System for Photovoltaic Panel." Hidraulica 1 (2015): 32.

*Primary Examiner* — Gail Kaplan Verbitsky
(74) *Attorney, Agent, or Firm* — Nath, Goldberg & Meyer; Richard C. Litman (57) ABSTRACT

The pneumatic solar tracking system for solar panels adjusts the angular orientation of a solar panel to maximize exposure of an upper surface of the solar panel to incident solar radiation from the sun as the sun moves across the sky. The pneumatic solar tracking system includes a base and a platform supported above the base. The platform has an opening formed therein. A plurality of pneumatic actuators are supported on the base beneath the opening formed in the platform. The solar panel is supported on an upper surface of the platform, and a plurality of pivotal connectors pivotally connect the lower surface of the solar panel to respective pistons of the plurality of pneumatic actuators. Each of the pivotal connectors pivots along at least two orthogonal axes. An optical sensor is provided for detecting and tracking the angular position of the sun.

20 Claims, 5 Drawing Sheets

(51) Int. Cl.
*G05B 19/44* (2006.01)
*G01K 1/14* (2021.01)
*G01K 1/024* (2021.01)
*G01B 11/26* (2006.01)
*G01C 9/02* (2006.01)

(52) U.S. Cl.
CPC .............. *G01K 1/024* (2013.01); *G01K 1/14* (2013.01); *G05B 19/44* (2013.01); *G05B 2219/25312* (2013.01)

(58) Field of Classification Search
CPC ........... G05B 2219/25312; F24S 50/20; Y02E 10/47; Y02E 10/50
USPC ........................................ 136/243, 244, 246
See application file for complete search history.

(56) References Cited

U.S. PATENT DOCUMENTS

| | | | |
|---|---|---|---|
| 8,895,836 B2 | 11/2014 | Amin et al. | |
| 10,749,465 B2 | 8/2020 | Iyer | |
| 10,848,097 B1 * | 11/2020 | Needham | G01M 9/06 |
| 2008/0000515 A1 | 1/2008 | Lin et al. | |
| 2013/0037082 A1 * | 2/2013 | Grant | H02S 30/20 |
| | | | 136/246 |
| 2018/0091088 A1 * | 3/2018 | Barton | F24S 30/425 |
| 2021/0167721 A1 * | 6/2021 | Chaouki Almagro | F16F 15/035 |

* cited by examiner

PNEUMATIC SOLAR TRACKING SYSTEM FOR SOLAR PANELS

BACKGROUND

1. Field

The disclosure of the present patent application relates to solar power, and particularly to a pneumatic solar tracking system for solar panels that uses pneumatic actuators to adjust the orientation of the solar panel.

2. Description of the Related Art

Due to environmental concerns, solar power is of great interest. Although solar panels are typically mounted in areas where sunlight is expected to be abundant, as a result of the orbit and rotation of the Earth, the direction and alignment of solar panels with respect to the sun varies over time, both over the course of a single day, and also over the course of the year. Thus, in order to maintain proper orientation of the solar panel with respect to the position of the sun, the solar panel must be angularly displaced in order to track the apparent movement of the sun. Ideally, in order to maximize the sunlight striking the surface of the solar panel, the solar panel should be adjusted such that the sun's rays are approximately perpendicular to the surface of the solar panel. Although a wide variety of solar tracking systems exist, the physical driven movement of the solar panel is typically performed in only a limited number of ways, most often involving relatively complex mechanical arrangements of gears, rods, wheels, pulleys or chains, etc. Unfortunately, these complex machines are subject to numerous problems, particularly since a flaw in, or misalignment of, only one part tends to affect any other connected parts. Since proper angular orientation of the solar panel is desired for optimization of power output, it would be helpful to simplify the apparatus used for actuating movement of the solar panel to track the sun, particularly to reduce the possible number of mechanical issues that can occur. Thus, a pneumatic solar tracking system for solar panels solving the aforementioned problems is desired.

SUMMARY

The pneumatic solar tracking system for solar panels adjusts the angular orientation of a solar panel to maximize exposure of an upper surface of the solar panel to impinging solar radiation from the sun as the sun moves across the sky. The pneumatic solar tracking system includes a base and a platform supported above the base. The platform has an opening formed therein. A plurality of pneumatic actuators are supported on the base, beneath the opening formed in the platform. A pressurized air tank is in fluid communication with the plurality of pneumatic actuators, and an air compressor is in fluid communication with both the pressurized air tank and the pneumatic actuators for controlling flow of air therebetween. The solar panel is supported on an upper surface of the platform, and a plurality of pivotal connectors pivotally connect a lower surface of the solar panel to respective pistons of the plurality of pneumatic actuators. Each of the pivotal connectors pivots along at least two orthogonal axes. For example, each of the pivotal connectors may include first and second brackets, the first bracket being adapted for mounting on the lower surface of the solar panel. A first shaft is rotatably held by the first bracket, such that the first shaft defines a first axis of rotation. The second bracket is secured to the first shaft, and a second shaft is rotatably held by the second bracket, such that the second shaft defines a second axis of rotation orthogonal to the first axis of rotation, and a corresponding piston is secured to the second shaft.

An optical sensor is provided for detecting the angular position of the sun. A controller is in communication with the optical sensor, and is configured to selectively and individually actuate each of the plurality of pneumatic actuators to adjust the angular orientation of the solar panel to maximize exposure of the upper surface of the solar panel to incident solar radiation from the sun.

Additionally, a pressure gauge may be provided for monitoring the pressure of air flow from the air compressor. Further, at least one air nozzle may be mounted on the platform adjacent the solar panel for selectively cleaning the solar panel. The at least one air nozzle is in fluid communication with the air compressor so that the solar panel can be selectively cleaned with pressurized air blowing on its upper surface.

The air flowing to and from the plurality of pneumatic actuators may be controlled by any suitable type of valves. For example, solenoid valves in communication with the controller may be used. Additionally, at least one level sensor in communication with the controller may be provided for measuring the orientation of the solar panel. In addition to sensing orientation, a temperature sensor may be mounted on the platform for measuring ambient temperature in the vicinity of the solar panel. The measured temperature may be displayed on a temperature indicator in communication with the temperature sensor.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
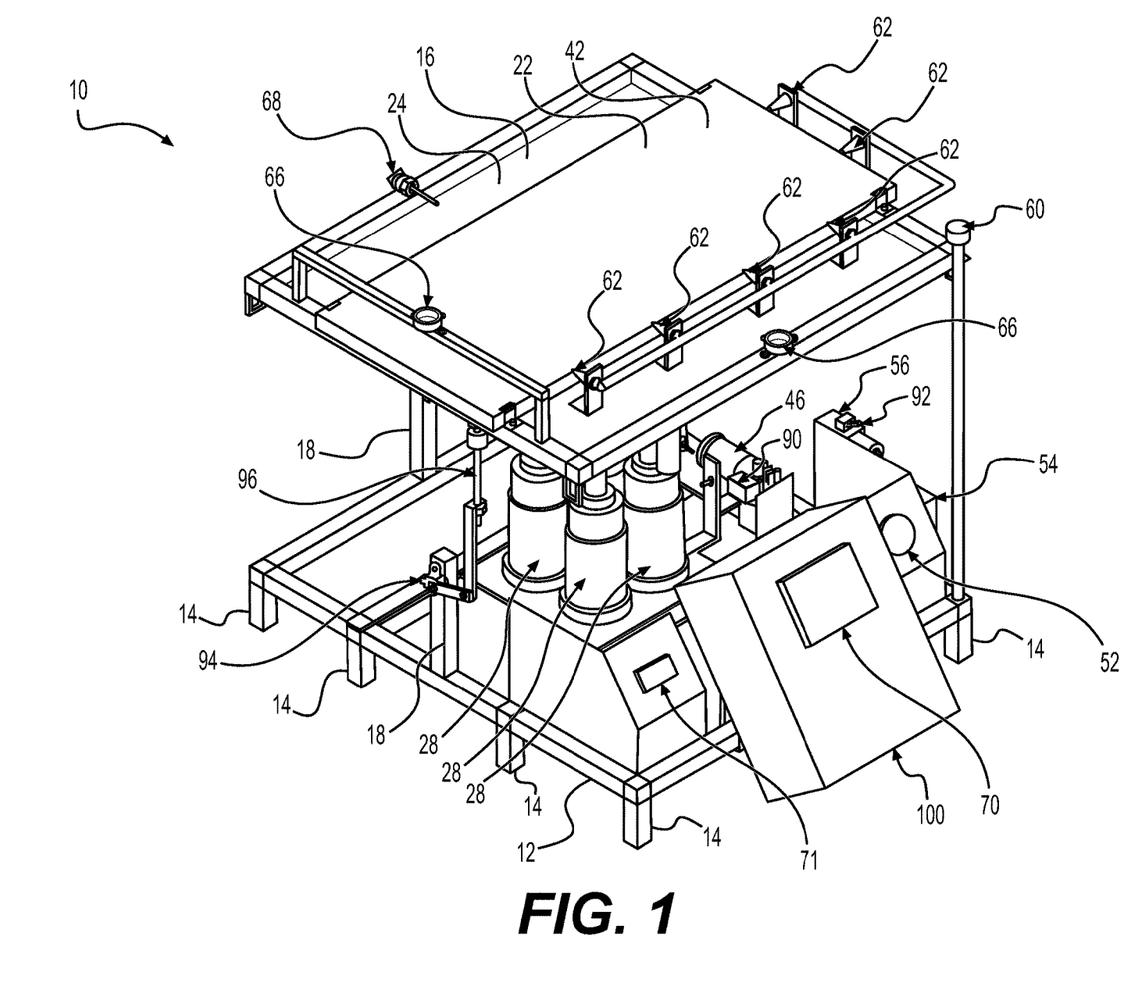
FIG. 1 is a perspective view of a pneumatic solar tracking system for solar panels as viewed from the right side of the apparatus.
Figure 2:
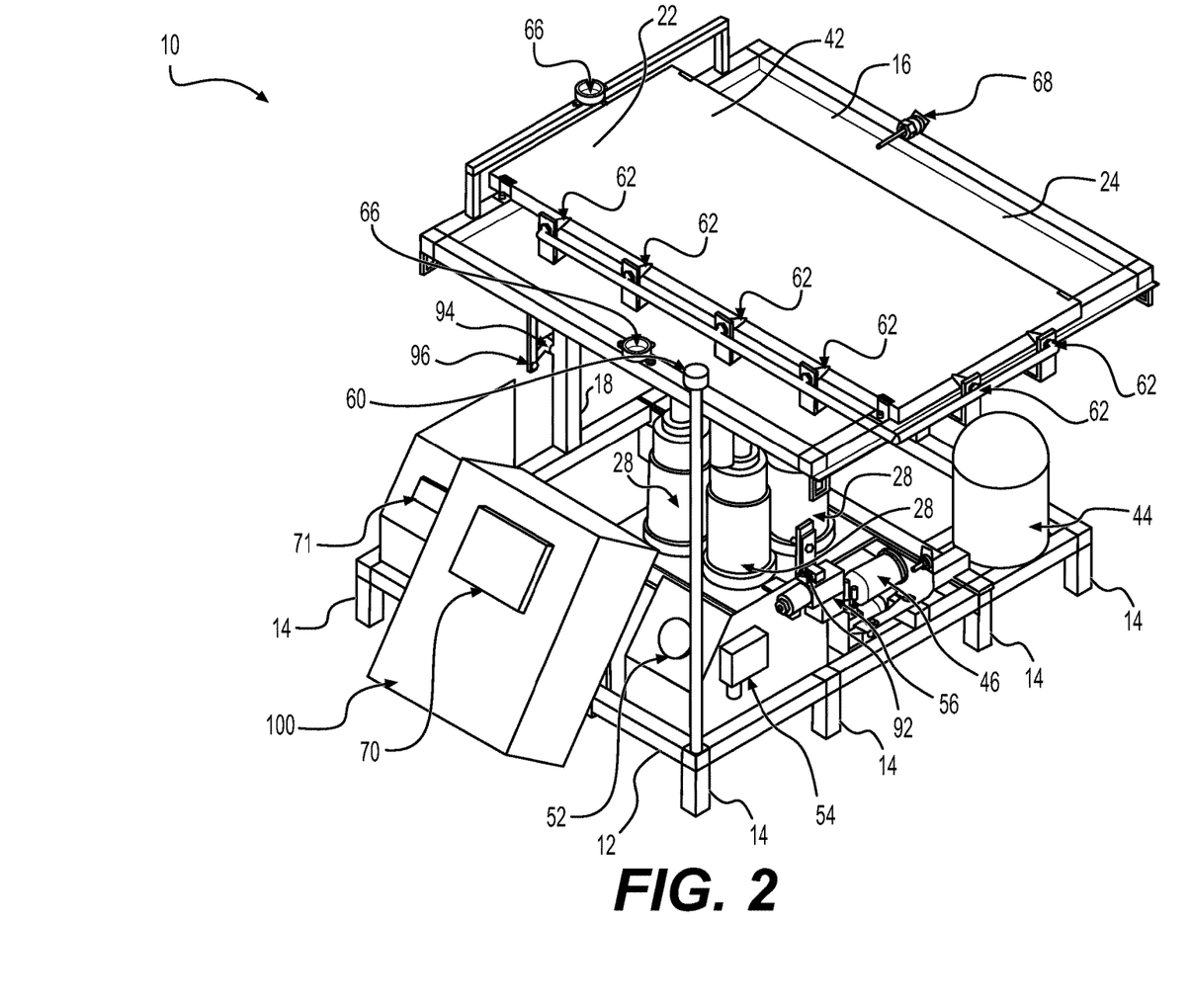
FIG. 2 is a perspective view of the pneumatic solar tracking system for solar panels as viewed from the left side of the apparatus.
Figure 3:
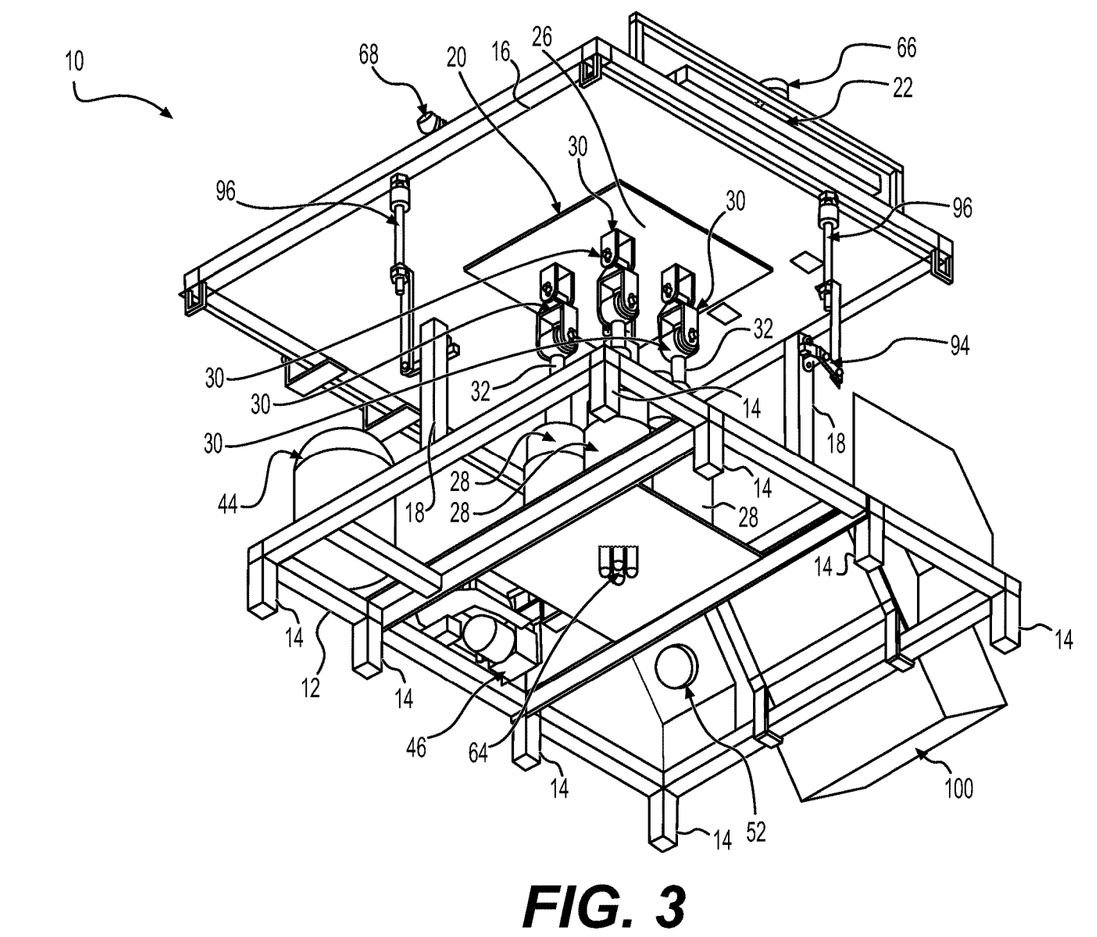
FIG. 3 is a perspective view of the pneumatic solar tracking system for solar panels as viewed from beneath the apparatus.

Referring now to FIGS. 1-3, there is shown a pneumatic solar tracking system for solar panels 10, which adjusts the angular orientation of a solar panel 22 to maximize exposure of an upper surface 42 thereof to incident solar radiation from the sun as the sun moves across the sky. The pneumatic solar tracking system 10 includes a base 12 and a platform 16 supported above the base 12. It should be understood that the overall dimension and configuration of the base 12 (including legs 14) are shown in FIGS. 1-3 for exemplary purposes only. Similarly, it should be understood that the overall dimension and configuration of the platform 16 are also shown in FIGS. 1-3 for exemplary purposes only. Additionally, it should be understood that the solar panel 22 is shown for exemplary purposes only, and that the pneumatic solar tracking system 10 may be used with any suitable type of solar panel, solar cell, solar module, solar concentrator or the like.

Figure 5:
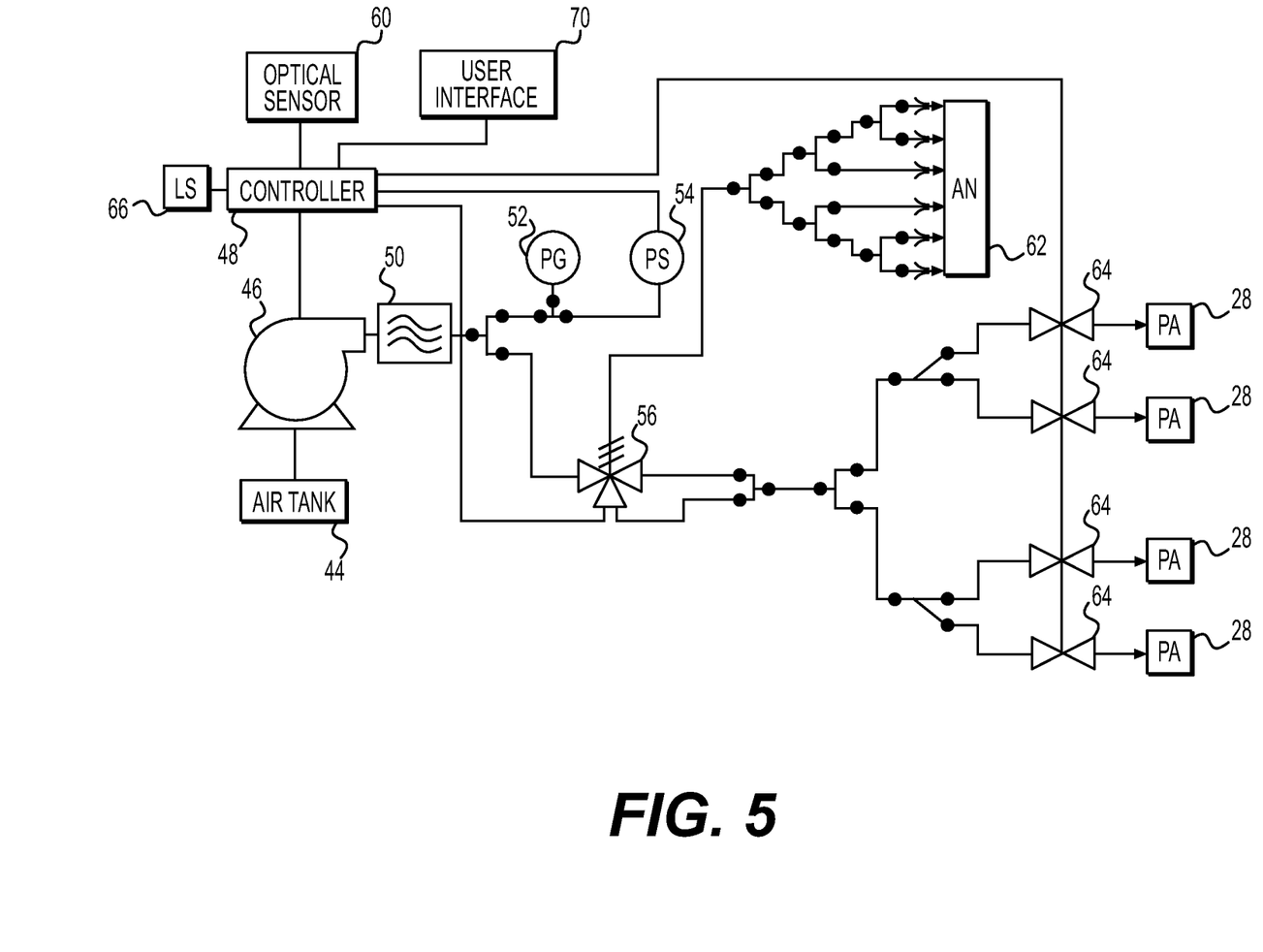
FIG. 5 is a schematic diagram of the pneumatic solar tracking system for solar panels.

As best seen in FIG. 3, the platform 16 has an opening 20 formed therein. It should be understood that the substantially square opening 20 through which the lower surface 26 of the solar panel 22 can be seen is shown for exemplary purposes only, and that the opening 20 may have any suitable dimensions and configuration. A plurality of pneumatic actuators 28 are supported on the base 12 beneath the opening 20. As shown in FIGS. 2 and 3, as well as in the schematic diagram of FIG. 5, a pressurized air tank 44 is in fluid communication with the plurality of pneumatic actuators (PAs) 28, and an air compressor 46 is in fluid communication with both the pressurized air tank 44 and the pneumatic actuators 28 for controlling a flow of air therebetween. It should be understood that any suitable type of pneumatic actuators may be used. It should be further understood that the four pneumatic actuators 28 shown in FIGS. 1-3 and 5 are shown for exemplary purposes only, and that any suitable number of pneumatic actuators may be used. Further, as illustrated in FIG. 5, the air compressor 46 may be provided with an air filter 50. It should be understood that any suitable type of air filter may be used.

Figure 4:
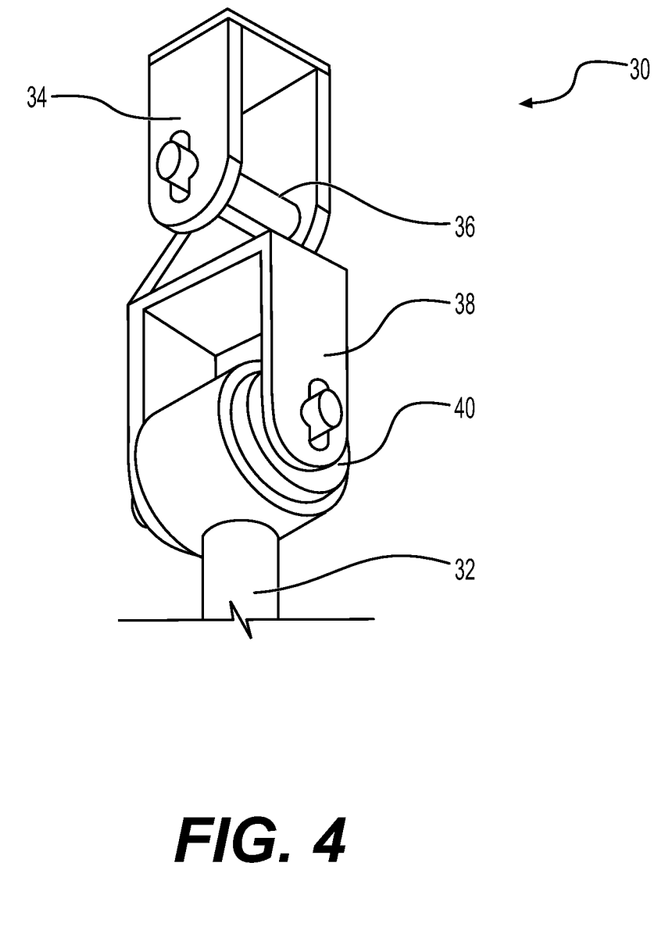
FIG. 4 is a perspective view of an exemplary pivotal connector of the pneumatic solar tracking system for solar panels.

The solar panel 22 is supported on an upper surface 24 of the platform 16, and a plurality of pivotal connectors 30 pivotally connect the lower surface 26 of the solar panel 22 to respective pistons 32 of the plurality of pneumatic actuators 28. The opening 20 formed through the platform 16 allows the pistons 32 to be connected to the lower surface 26 of the solar panel 22 via the pivotal connectors 30. Each of the pivotal connectors 30 pivots along at least two orthogonal axes, allowing the solar panel 22 to be angularly adjusted along at least two axes. It should be understood that any suitable type of two-axis (or more) pivotal connectors may be used. In the example of FIGS. 3 and 4, each of the pivotal connectors 30 includes first and second clevis mounts or brackets 34, 38, respectively, the first bracket 34 being adapted for mounting on the lower surface 26 of solar panel 22. It should be understood that first bracket 34 may be mounted on, or secured to, the lower surface 26 using any suitable means of attachment. A first clevis pin or shaft 36 rotatably extends through opposing arms of the first bracket 34, such that the first shaft 36 extends along, and is rotatable about, a first axis of rotation. The second bracket 38 is secured to the first axle 36 by an oblique strap rotatably mounted on the first clevis pin or shaft 36, and a second clevis pin or shaft 40 is rotatably mounted between opposing arms of the second clevis or bracket 38, such that the second shaft 40 defines a second axis of rotation. The second axis of rotation is orthogonal to the first axis of rotation, and a corresponding one of the pistons 32 is secured to the second shaft 40.

As shown in FIG. 5, an optical sensor 60 is provided for detecting the angular position of the sun, both by altitude and azimuth. A controller 48 is in communication with the optical sensor 60, and is configured to selectively and individually actuate each of the pneumatic actuators 28 to adjust the angular orientation of the solar panel 22 to maximize exposure of the upper surface 42 of solar panel 22 to incident solar radiation from the sun. It should be understood that the controller 48 may be any suitable type of controller, such as a programmable logic controller, a microprocessor, a processor integrated into a personal computer, or the like. In use, individual pneumatic actuators 28 may be selectively actuated to raise and lower their respective pistons 32, thus allowing the solar panel 22, which is pivotally mounted to the upper end of each piston 32, to be angularly adjusted along at least two different orthogonal axes.

Additionally, a pressure gauge 52 may be provided for monitoring the pressure of air flowing from the air compressor 46. A pressure switch 54 in communication with pressure gauge 52 may be used to automatically or manually control the pressure based on feedback provided by pressure gauge 52. Additionally, a three-way pressure relief valve 56 is in fluid communication with the air compressor 46, the plurality of pneumatic actuators 28, and at least one air nozzle (AN) 62, as will be discussed in greater detail below. In addition to the three-way pressure relief valve 56, an automatic safety relief valve 90, and a manual pressure relief valve 92 may be provided.

As noted above, at least one air nozzle (AN) 62 may be mounted on the platform 16 adjacent the solar panel 22 for selectively cleaning the solar panel 22. The at least one air nozzle 62 is in fluid communication with the air compressor 46 so that the solar panel 22 can be selectively cleaned with pressurized air blowing on its upper surface 42. It should be understood that the six air nozzles 62 shown in FIGS. 1 and 2 are shown for exemplary purposes only, and that any suitable number of air nozzles may be used. Additionally, it should be understood that any suitable type of air nozzles or blowers may be used.

The air flowing to and from the plurality of pneumatic actuators 28 may be controlled by any suitable type of valves. For example, solenoid valves 64, as shown in FIG. 3, may be in communication with the controller 48 for controlling pneumatic actuators 28. Additionally, at least one level sensor (LS) 66 in communication with the controller 48 may be provided for measuring an angular orientation of the solar panel 22. It should be understood that the two platform-mounted level sensors 66 shown in FIGS. 1 and 2 are shown for exemplary purposes only, and that any suitable number of level sensors 66 may be used. As will be described in greater detail below, the two exemplary level sensors 66 are shown positioned adjacent respective perpendicular edges of solar panel 22, thus allowing one level sensor 66 to measure tilt of the solar panel in the east-west direction, for example, and the other to measure tilt in the north-south direction, for example. It should be understood that any suitable type of level sensors may be used. Level sensors 66 may be, for example, accelerometers mechanically coupled to the solar panel 22.

In addition to the platform-mounted level sensors 66, additional level sensors 94 may be used for monitoring the level of platform 16 and/or the level of solar panel 22. In FIGS. 1-3, the additional level sensors 94 are attached to substantially L-shaped flexible joints 96, each having an upper end fixed to the lower surface of platform 16, and a lower end pivotally attached to a respective vertical support 18 of base 12. If the platform 16 pivots with respect to base 12, the lower end of each flexible joint 96 will also be driven to pivot, and this rotational movement will be detected by the corresponding level sensor 94.

In addition to sensing orientation, a temperature sensor 68 may be mounted on the platform 16 for measuring the ambient temperature in the vicinity of the solar panel 22. The measured temperature may be displayed on a temperature indicator 71 in communication with the temperature sensor 68. Further, as best seen in FIGS. 1 and 2, a user interface 70 may be mounted on base 12, allowing the user to control and receive output from the controller 48. It should be understood that the user interface 70 may be any suitable type of interface. For example, the user interface 70 may be a touchscreen. It should be understood that the mount 100 for the user interface 70 is shown for exemplary purposes only, and may be, for example, a conventional mounting structure, or may, alternatively, include additional controls in communication with the controller 48.

As discussed above, in use, individual pneumatic actuators 28 may be selectively actuated to raise and lower their respective pistons 32, thus allowing the solar panel 22, which is pivotally mounted to the upper end of each piston 32, to be angularly adjusted along at least two different orthogonal axes. Single-axis tracking may be achieved by dividing the four pneumatic actuators 28 into two pairs, with each pair acting together in sync. Thus, as an example, while tracking the sun's path from east to west throughout the day, the east-most pair of pneumatic actuators 28 may have their respective pistons 32 lowered, and the west-most pair of pneumatic actuators 28 may have their respective pistons 32 raised, thus tilting the solar panel 22 towards the east. As the sun's path relative to the pneumatic solar tracking system for solar panels 10 travels from east to west, the east-most pair of pneumatic actuators 28 having their respective pistons 32 rising, with the west-most pair of pneumatic actuators 28 having their respective pistons 32 lowering to the same degree.

In the above example, the optical sensor 60 can measure the sun's altitude angle as a function of time, $\alpha(t)$, and the sun's azimuth angle as a function of time, $\gamma(t)$. In this single-axis tracking example, it is assumed that the altitude angle, $\alpha(t)$, is fixed. Level sensors 66 can provide initial orientation data for the solar panel 22, and the controller 48 can use this data, combined with the altitude angle $\alpha(t)$ and the azimuth angle $\gamma(t)$, to calculate the east-west (EW) reference tilt angle for the solar panel 22, $\beta_{EW}(t)$. The reference tilt angle $\beta_{EW}(t)$ is the ideal tilt angle of the solar panel 22 based on the real time position of the sun, in order to optimize the solar exposure on the upper surface 42 of the solar panel 22. Real time feedback can be used to constantly monitor and correct the tilt of the solar panel 22. Level sensors 66, which may be accelerometers or the like, can maintain constant monitoring of the real time tilt angle of the solar panel 22, $\beta(t)$, allowing an error, $\Delta\beta_{EW}(t)$, to be calculated as $\Delta\beta_{EW}(t)=\beta_{EW}(t)-\beta(t)$. As $\Delta\beta_{EW}(t)$ deviates from a value of 0, this measurement may be used by the controller 48 to selectively raise or lower the pistons 32 of pairs of pneumatic actuators 28 such that an error value of 0 is restored. The error value of 0 represents the tilt angle matching the ideal tilt angle at which the solar exposure is maximized.

Alternatively, since solar data is very well known for almost all locations on the planet, rather than using an optical sensor 60 to track the sun's position in the sky, the optical sensor 60 may be replaced by a clock integrated into the controller 48. Thus, for a given location, it is already known that at 11:00 AM, for example, the sun has a given altitude and azimuth, and at 11:05 AM, the sun has another given altitude and azimuth, etc. This pre-programmed knowledge of the sun's position based on the time of day may be used to calculate $\beta_{EW}(t)$, rather than making real time optical measurements of the sun's position.

In addition to the single-axis tracking discussed above, the pneumatic solar tracking system for solar panels 10 may also be used for dual-axis tracking, where the calculation is more complex, since it is not assumed that the altitude is fixed. Thus, the optical sensor 60 can measure the sun's altitude angle as a function of time, $\alpha(t)$, and the sun's azimuth angle as a function of time, $\gamma(t)$, where $\alpha(t)$ is now expected to vary. Level sensors 66 can provide initial orientation data for the solar panel 22, and the controller 48 can use this data, combined with the altitude angle $\alpha(t)$ and the azimuth angle $\gamma(t)$, to calculate both the east-west (EW) reference tilt angle for the solar panel 22, $\beta_{EW}(t)$, and the north-south (NS) reference tilt angle for solar panel 22, $\beta_{NS}(t)$. For example, in FIGS. 1 and 2, the two level sensors 66 are shown adjacent respective perpendicular edges of the solar panel 22, allowing one level sensor to be used for EW tilt measurements, and the other to be used for NS tilt measurements.

The reference tilt angle $\beta_{EW}(t)$ is the ideal EW tilt angle of the solar panel 22, and the reference tilt angle $\beta_{NS}(t)$ is the ideal NS tilt angle of the solar panel 22, each based on the real time position of the sun, in order to optimize the solar exposure on the upper surface 42 of the solar panel 22. Real time feedback is again used to constantly monitor and correct the tilt of the solar panel 22, but now in both the EW and NS directions. Level sensors 66 maintain constant monitoring of the real time set of the tilt angles of the solar panel 22, $\beta(t)$, allowing errors in each direction, $\Delta\beta_{EW}(t)$ and $\Delta\beta_{NS}(t)$, respectively, to be calculated as $\Delta\beta_{EW}(t)=\beta_{EW}(t)-\beta(t)$ and $\Delta\beta_{NS}(t)=\beta_{NS}(t)-\beta(t)$. As $\Delta\beta_{EW}(t)$ and/or $\Delta\beta_{NS}(t)$ deviate from values of 0, the controller 48 may selectively raise or lower individual pistons 32 of the pneumatic actuators 28 such that error values of 0 are restored. As with the previous example, the real time monitoring of the sun's position using optical sensor 60 may be replaced with a clock and a pre-programmed data set containing known positions of the sun as a function of time for that particular geographical location.

It is to be understood that the pneumatic solar tracking system for solar panels is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A pneumatic solar tracking system for solar panels, comprising:
    a base;
    a platform supported above the base, the platform having an upper surface, a lower surface, and an opening formed therein;
    a plurality of pneumatic actuators supported on the base beneath the opening formed in the platform, each of the pneumatic actuators having a corresponding piston extendable and retractable through the opening in the platform;
    a solar panel supported on the upper surface of the platform, the solar panel having an upper surface;
    a plurality of pivotal connectors pivotally connecting the lower surface of the solar panel to the corresponding piston of a corresponding one of the pneumatic actuators through the opening in the platform, each of the pivotal connectors being pivotal along at least two orthogonal axes;
    an optical sensor configured for continuously detecting the angular position of the sun; and
    a controller in communication with the optical sensor, the controller being configured to selectively and individually actuate each of the pneumatic actuators to adjust angular orientation of the solar panel to maximize exposure of the upper surface of the solar panel to incident solar radiation from the sun.

2. The pneumatic solar tracking system as recited in claim 1, wherein each said pivotal connector comprises:
 a first clevis having a cross panel mounted on the lower surface of the solar panel and two opposed, parallel arms extending from the cross panel;
 a first clevis pin extending between the opposed arms of the first clevis, the first clevis pin defining a first axis of rotation;
 a second clevis rotatably mounted on the first clevis pin, the second clevis having a cross panel and two opposed, parallel arms extending from the cross panel; and
 a second clevis pin extending between the opposed arms of the second clevis, the second clevis pin defining a second axis of rotation orthogonal to the first axis of rotation, a corresponding one of the pistons being rotatably mounted on the second clevis pin.

3. The pneumatic solar tracking system as recited in claim 1, further comprising a pressurized air tank in fluid communication with the plurality of pneumatic actuators.

4. The pneumatic solar tracking system as recited in claim 3, further comprising an air compressor in fluid communication with the pressurized air tank and the pneumatic actuators for controlling flow of air therebetween.

5. The pneumatic solar tracking system as recited in claim 4, further comprising a pressure gauge for monitoring pressure of the air flowing from the air compressor.

6. The pneumatic solar tracking system as recited in claim 4, further comprising at least one air nozzle mounted on the platform adjacent the solar panel for selectively cleaning the solar panel, the at least one air nozzle being in fluid communication with the air compressor.

7. The pneumatic solar tracking system as recited in claim 4, further comprising a plurality of valves connected to said pneumatic actuators for respectively controlling the flow of air to and from said pneumatic actuators.

8. The pneumatic solar tracking system as recited in claim 7, wherein each of said valves comprises a solenoid valve.

9. The pneumatic solar tracking system as recited in claim 1, further comprising at least one level sensor in communication with said controller for measuring angular orientation of the solar panel.

10. The pneumatic solar tracking system as recited in claim 1, further comprising a temperature sensor mounted on the platform.

11. The pneumatic solar tracking system as recited in claim 10, further comprising a temperature indicator in communication with the temperature sensor for displaying a measured temperature.

12. A pneumatic solar tracking system for solar panels, comprising:
 a base;
 a platform supported above the base, the platform having an upper surface, a lower surface, and an opening formed therein;
 a plurality of pneumatic actuators supported on the base beneath the opening formed in the platform, each of the pneumatic actuators having a corresponding piston extendable and retractable through the opening in the platform;
 a pressurized air tank in fluid communication with the pneumatic actuators;
 an air compressor in fluid communication with the pressurized air tank and the pneumatic actuators for controlling flow of air therebetween;
 a solar panel supported on the upper surface of the platform, the solar panel having an upper surface;
 a plurality of pivotal connectors pivotally connecting the lower surface of the solar panel to the corresponding piston of a corresponding one of the pneumatic actuators through the opening in the platform, each of the pivotal connectors being pivotal along at least two orthogonal axes;
 an optical sensor for detecting the angular position of the sun; and
 a controller in communication with the optical sensor, the controller being configured to selectively and individually actuate each of the pneumatic actuators to adjust angular orientation of the solar panel to maximize exposure of the upper surface of the solar panel to incident solar radiation from the sun.

13. The pneumatic solar tracking system as recited in claim 12, wherein each said pivotal connector comprises:
 a first clevis having a cross panel mounted on the lower surface of the solar panel and two opposed, parallel arms extending from the cross panel;
 a first clevis pin extending between the opposed arms of the first clevis, the first clevis pin defining a first axis of rotation;
 a second clevis rotatably mounted on the first clevis pin, the second clevis having a cross panel and two opposed, parallel arms extending from the cross panel; and
 a second clevis pin extending between the opposed arms of the second clevis, the second clevis pin defining a second axis of rotation orthogonal to the first axis of rotation, a corresponding one of the pistons being rotatably mounted on the second clevis pin.

14. The pneumatic solar tracking system as recited in claim 12, further comprising a pressure gauge for monitoring air pressure of the air flowing from the air compressor.

15. The pneumatic solar tracking system as recited in claim 12, further comprising at least one air nozzle mounted on the platform adjacent the solar panel for selectively cleaning the solar panel, the at least one air nozzle being in fluid communication with the air compressor.

16. The pneumatic solar tracking system as recited in claim 12, further comprising a plurality of valves connected to said pneumatic actuators for respectively controlling the flow of air to and from said pneumatic actuators.

17. The pneumatic solar tracking system as recited in claim 16, wherein each of said valves comprises a solenoid valve.

18. The pneumatic solar tracking system as recited in claim 12, further comprising at least one level sensor in communication with the controller for measuring angular orientation of said solar panel.

19. The pneumatic solar tracking system for solar panels as recited in claim 12, further comprising a temperature sensor mounted on the platform.

20. The pneumatic solar tracking system for solar panels as recited in claim 19, further comprising a temperature indicator in communication with the temperature sensor for displaying a measured temperature.

* * * * *